2 Sheets—Sheet 1.

H. CREAMER.

STEAM FEED WATER TRAP.

No. 10,853. Reissued Aug. 2, 1887.

WITNESSES:

F. W. Rosenbaum.
Martin Petry.

INVENTOR
Henry Creamer
BY
Bremer & Kaegener
ATTORNEYS

N. PETERS, Photo-Lithographer, Washington, D. C.

2 Sheets—Sheet 2.

H. CREAMER.

STEAM FEED WATER TRAP.

No. 10,853. Reissued Aug. 2, 1887.

WITNESSES:

F. W. Rosenbaum.
Martin Petry.

INVENTOR
Henry Creamer
BY
Goepel & Raegener
ATTORNEYS

N. PETERS, Photo-Lithographer, Washington, D. C.

UNITED STATES PATENT OFFICE.

HENRY CREAMER, OF NEW YORK, N. Y.

STEAM FEED-WATER TRAP.

SPECIFICATION forming part of Reissued Letters Patent No. 10,853, dated August 2, 1887.

Original No. 358,964, dated March 8, 1887. Application for reissue filed April 1, 1887. Serial No. 233,322.

*To all whom it may concern:*

Be it known that I, HENRY CREAMER, of the city, county, and State of New York, have invented certain new and useful Improvements in Steam Feed-Water Traps, (which has been patented to me in England by Letters Patent No. 3,539, dated March 8, 1887,) of which the following is a specification.

This invention relates to certain new and useful improvements in steam feed-water traps, which are used for automatically forcing the water of condensation or other boiler feed-water into the boiler when a certain quantity of such feed-water has collected.

The object of my invention is to provide an automatic feed-water trap in which the exhaust-steam of the trap is carried from above the upper piston to a point below the same, and is then forced into the pipe through which the water of condensation is conducted to the trap.

The invention consists in the construction and combination of parts and details, as will be fully described and set forth hereinafter, and finally pointed out in the claims.

Figure 1:
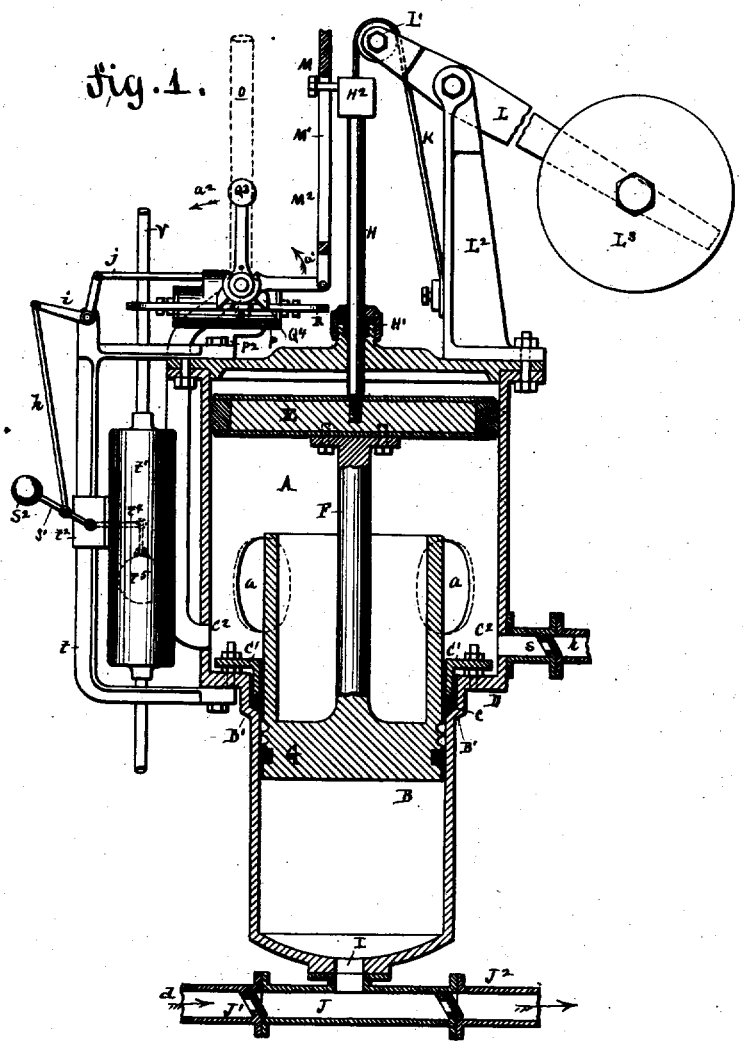
Figure 2:
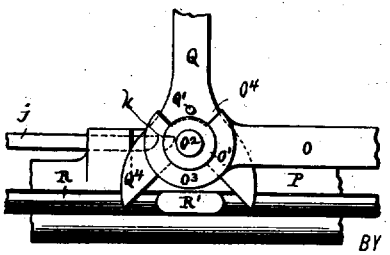
Figure 3:
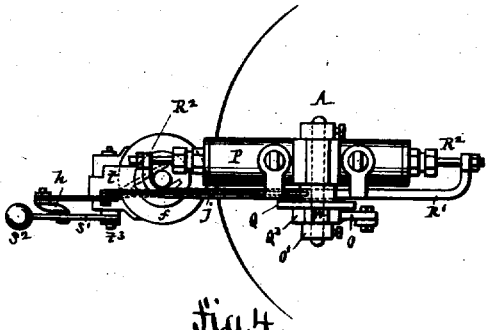
Figure 4:
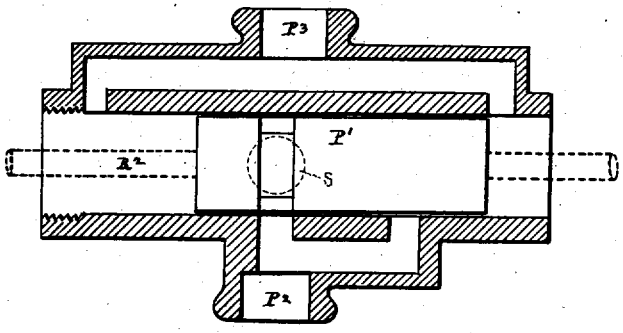
Figure 5:
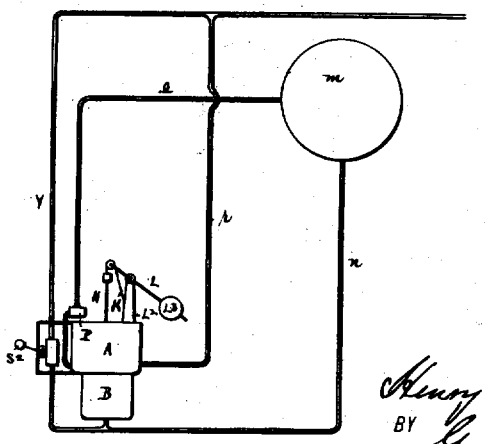

In the accompanying drawings, Figure 1 is a longitudinal sectional elevation of my improved feed-trap. Fig. 2 is an enlarged detail view of the valve movement. Fig. 3 is a plan view of the same, parts being omitted. Fig. 4 is a longitudinal sectional elevation of the slide valve, and Fig. 5 is a diagram view showing the general arrangement of the trap.

Similar letters of reference indicate corresponding parts.

The steam-cylinder A and the smaller water-cylinder, B, are cast in one piece, the latter cylinder being provided a short distance below its upper end with an internal annular shoulder, B′, on which a packing-ring, C, is placed and held in place by an angle-iron ring, C′, through which bolts $C^2$ are passed into the annular offset or shoulder D, forming the bottom of the steam-cylinder A. The said cylinder A is provided with suitable hand-holes *a*, which can be closed by suitable covers held in place by suitable means.

The piston E in the water-cylinder B and the piston G in the steam-cylinder A are connected by the rod F.

The water-cylinder is provided in its bottom with the opening I, which is in communication with the pipe J, having the check-valves J′ and $J^2$ at opposite sides of the aperture I, the said check-valves both opening in the same direction, the water passing through the pipe J in the direction of the arrow *d*. A piston-rod, H, passes to the stuffing-box H′ on the top of the steam-cylinder A, and is provided at its upper end with a head, $H^2$, through which head is fastened one end of a chain or metal strap, K, passed over the roller L′, pivoted on one end of the lever L, pivoted on a standard, $L^2$, on the top of the cylinder A, the other end of the metal strap or chain K being fastened to said standard. A weight, $L^3$, is fastened or held on the other end of the lever L to counterbalance the two pistons.

A headed pin, M, projects from the head $H^2$ on the top of the piston-rod H and passes through a longitudinal slot, M′, of a vertical rod or bar, $M^2$, the lower end of which is pivoted to the arm O of a sleeve, O′, mounted loosely on the pivot $O^2$, projecting from the side of a horizontal cylindrical valve-casing, P, on the head of the cylinder A. Said sleeve O′ is provided with a collar, $O^3$, having a recess, $O^4$, the length of which is about equal to one-third of a circle. Into the said notch or recess $O^4$ a pin, Q′, passes from a lever, Q, mounted to rock on the pivot $O^2$, which lever Q is provided at its lower end with two shanks, $Q^4$, between which a V-shaped recess is formed, a weight, $Q^5$, being fastened on the upper end of the rocking lever Q. A lug, R′, projects from a sliding U-shaped rod, R, into the recess formed by the shanks $Q^4$ $Q^4$ of the rocking lever Q, the ends of said U-shaped rod being connected with the opposite ends of the stem $R^2$ of the sliding valve P′ in the casing P. The neck $P^2$ of the casing P is connected with the cylinder A. The neck $P^3$ of the casing P is connected with the boiler *m* by the pipe *o*, and the casing P is connected by a pipe, S, with the bottom part of the cylinder A. The pipe J is connected by a pipe, *n*, with the boiler *m*. The lower part of the cylinder A is connected by the pipe *r*, having the check-valve *s*, with the pipe *p*.

A pipe, V, forms connection between the pipe *p* and pipe J, and within a frame, *t*, fastened on the side of the cylinder A, an enlargement, $t'$, is formed in the pipe V, on the side of which enlargement the box $t^2$ is formed. A rock-shaft, $t^3$, is mounted in the box $t^2$, and is provided with an arm, $t^4$, projecting into the enlargement $t'$, from which arm $t^4$ a float, $t^5$, is suspended or supported in any suitable manner. The shaft $t^3$ is provided at one end with an arm, $s'$, carrying a ball, $s^2$. The arm $s'$ is connected by a rod, $h$, with the angle-lever $i$, pivoted on top of the frame $t$, the other end of said angle-lever being connected with the sliding bolt $j$, the end of which can pass into the notch $k$ in the collar $o^3$, mounted on the pivot $O^2$.

The operation is as follows: The water of condensation passes through the pipe J in the direction of the arrow $d$, Fig. 1, opens the left-hand check-valve J', passes into the water-cylinder B, and exerts an upward pressure on the bottom piston, C, which, with the upper piston, E, rises. The lever L swings down, and the metal strap or chain K draws the piston-rod and valve upward. As the upper piston, E, ascends the exhaust-steam above the same passes into the valve-casing P, the valve being in proper position, and then down through the pipe S into the bottom part of the steam-cylinder below the steam-piston. The valve is then reversed so as to admit live steam into the upper part of the cylinder A, which steam, acting on the large upper piston, forces the same downward, whereby the lower piston, C, of the water-cylinder forces the water out through the aperture I into the pipe J and check-valve J' into the boiler. At the same time the piston E forces the exhaust-steam, which was conducted from above the upper piston to below the same, through the pipe $r$ into the pipe $p$, through which the return or condensed water of condensation passes from the engine-register, &c. The exhaust-steam of the steam-trap is thus mixed with the return or water of condensation coming from the register or engine. When the pistons E and G are forced downward, the piston-rod H is also moved down, and the metal strap or chain acting on the lever L swings the weighted end of said lever upward, and so on. When the pistons have completed their upward stroke, the headed pin M' on the upper end of the piston-rod H strikes against the upper end of the slot in the vertical rod or bar $M^2$ and swings the same upward, thereby swinging the arm O in the direction of the arrow $a'$, Fig. 1. Then one end of the recess or notch $O^4$ strikes the pin Q', thereby throwing the arm Q out of a position of rest in the direction of the arrow $a^2$. Under the action of the weight $Q^3$ the rocking arm continues the stroke in the direction of the arrow $a^2$, and the left-hand shank $Q^4$, striking the lug R' of the U shaped rod R, moves said rod and the piston-valve P', in connection with the same, in the inverse direction of the arrow $a^2$, whereby the valve is shifted in such a manner as to admit live steam into the upper end of the cylinder A, under the action of which live steam the pistons are moved downward. When the pistons have completed their downward stroke, the headed pin M strikes the arm O and presses the same in the inverse direction of the arrow $a'$, whereby the other end of the recess $O^4$ in the collar $O^3$ strikes the pin Q' and swings the lever Q in the inverse direction of the arrow $a^2$ until said lever has passed its center, when it continues to swing in the inverse direction of the arrow $a^2$ under the action of the weight $Q^3$. Thereby the valve is shifted in the direction of the arrow $a^2$, the live-steam cut off, and the communication established between the cylinder A and pipe S.

It is not desirable that the apparatus should operate when there is not sufficient water in the pipes, and for this reason I have provided the enlargement $t'$ and the float in the same. The level of the water in the pipe V is always equal to the level of the water in the cylinders. When the level of the water in the cylinders and in the pipe $p$ is high, the float $t^5$ is raised and the weight $s^2$ lowered, and the bolt $j$ is withdrawn from the notch $k$ in the collar $o'$, and thus does not interfere with the operation of the valve mechanism. When the level of the water sinks, the float $t^5$ descends, the rod $h$ is moved upward, and the end of the bolt or latch $j$ is pushed into the notch $k$, whereby the valve mechanism is locked. The valve mechanism is thus always locked when the level of the water in the apparatus is too low, and is released when the level of the water rises to the proper height.

Having thus described my invention, I claim as new and desire to secure by Letters Patent—

1. In a steam feed-water trap, the combination, with united steam and water cylinders, of a piston in each cylinder, which pistons are connected, a piston-rod projecting from the upper piston through a stuffing-box in the head of the upper cylinder, a chain or strap secured to the said piston-rod and passed over a pulley on a pivoted lever, and a weight on said lever, substantially as shown and described.

2. The combination, with a steam-trap, of a pipe for conducting the water of condensation from the engine or registers, and a pipe connecting the steam-cylinder of the trap with the pipe for conducting the water of condensation to the steam-trap, substantially as shown and described.

3. The combination, with a steam-trap having a steam and water cylinder, a piston in each cylinder, and a rod connecting the pistons, of a rod projecting from the steam-piston and through the top of the steam-cylinder, a metal strap or chain secured to the upper end of said rod at one end and having the other end fastened, and a weighted pivoted lever provided on one end with a pulley or roller, over which the above-mentioned strap or chain is passed, substantially as shown and described.

4. In a steam-trap, the combination, with a united steam and water cylinder, each containing a piston, which are united by a rod to a piston-rod projecting upward from the upper piston, a valve on the steam-cylinder, which valve governs the admission and exit of steam, and a rod connected with the valve and operated from the above-mentioned piston-rod projecting from the top of the steam-cylinder, substantially as shown and described.

5. In a steam-trap, the combination, with the cylinders and pistons, of the valve-casing on top of the steam-cylinder, a pivot projecting from the side of the valve-casing, a notched sleeve mounted on the said casing and provided with an arm, a rod connecting said arm with the piston-rod, a rocking lever mounted on the pivot of the valve-casing, which lever has one end forked and one end weighted, a pin on said rocking lever, a slide-valve in the valve-casing, and a rod connecting the slide-valve with a rod projecting from the valve between the forked ends of the rocking lever, substantially as set forth.

6. In a steam-trap, the combination, with the cylinders and pistons in the same, of the valve casing on the steam-cylinder, a pivot projecting from the side of the valve-casing, a sleeve mounted on said pivot and provided with a notch, a notched collar on said sleeve, a rocking lever on the sleeve adjacent to the notched collar, which lever has one end weighted and the other end forked, a pin projecting from the side of the rocking lever, an arm on the above-mentioned collar, and a rod connecting said arm with the piston-rod projecting from the top of the cylinder, substantially as shown and described.

7. In a steam-trap, the combination, with the cylinders and pistons in the same, of a pipe for conducting the water of condensation into the apparatus, an enlargement in said pipe, a float in the enlargement, a shaft operated by the float, a bolt connected with said shaft, and a valve mechanism having a notch for receiving the end of the bolt, substantially as shown and described.

8. In a steam-trap, the combination, with cylinders and pistons in the same, of a valve mechanism operated from one of the piston-rods, a bolt for locking the valve mechanism, and a float-governor in the pipe connected with the apparatus, which float-governor is connected with the bolt, substantially as shown and described.

9. In a steam-trap, the combination, with a boiler and steam-trap, of a pipe for conducting the water of condensation to the trap, a pipe for conducting the water from the trap to the boiler, a pipe connecting the lower part of the steam-cylinder with the pipe that conducts the water of condensation to the trap, a valve on the trap, and a pipe for conducting steam from the boiler to the valve on the trap, substantially as shown and described.

10. In a steam feed-water trap, the combination, with united steam and water cylinders, of a piston in each cylinder, which pistons are connected with each other, a pipe for establishing communication between the upper part of said steam-cylinder and the lower part of the same, and a valve connected with said pipe for the purpose of controlling said pipe, substantially as shown and described.

In testimony that I claim the foregoing as my invention I have signed my name in presence of two subscribing witnesses.

HENRY CREAMER.

Witnesses:
OSCAR F. GUNZ,
SIDNEY MANN.